United States Patent [19]
Graves et al.

[11] Patent Number: 5,410,344
[45] Date of Patent: Apr. 25, 1995

[54] APPARATUS AND METHOD OF SELECTING VIDEO PROGRAMS BASED ON VIEWERS' PREFERENCES

[75] Inventors: Gordon T. Graves; Brendan M. O'Connor, both of Austin, Tex.; Alva C. Barker, Tempe, Ariz.

[73] Assignee: Arrowsmith Technologies, Inc., Austin, Tex.

[21] Appl. No.: 124,945

[22] Filed: Sep. 22, 1993

[51] Int. Cl.$^6$ ............................................. H04N 7/16
[52] U.S. Cl. ......................................... 348/1; 348/10; 455/2
[58] Field of Search ................ 348/1, 2, 5, 7, 12, 348/10; 358/84, 86; H04N 7/16, 7/173; 455/2, 4.2

[56] References Cited
U.S. PATENT DOCUMENTS

| | | | |
|---|---|---|---|
| 4,230,990 | 10/1980 | Lert, Jr. et al. | 455/67 |
| 4,527,194 | 7/1985 | Sirazi | 348/11 |
| 4,528,589 | 7/1985 | Block et al. | 348/1 |
| 4,578,700 | 3/1986 | Roberts et al. | 358/84 |
| 4,751,578 | 6/1988 | Reiter et al. | 358/183 |
| 4,816,904 | 3/1989 | McKenna et al. | 358/84 |
| 4,954,699 | 9/1990 | Coffey et al. | 235/462 |
| 5,036,537 | 7/1991 | Jeffers et al. | 348/1 |
| 5,179,439 | 1/1993 | Hashimoto | 358/86 |
| 5,189,630 | 2/1993 | Barstow et al. | 358/335 |
| 5,293,456 | 3/1994 | Guez et al. | 395/24 |

Primary Examiner—James J. Groody
Assistant Examiner—Chris Grant
Attorney, Agent, or Firm—Vinson & Elkins

[57] ABSTRACT

A method and apparatus for selecting audiovisual programs for presentation to a viewer. The audiovisual programs have attributes and a corresponding content code including information pertaining to the attributes. The method includes various steps. First, a viewer preference file is stored which includes information pertaining to the impact of various attributes of the audiovisual programs on the viewer. Second, a plurality of content codes corresponding to a plurality of the audiovisual programs are received. Third, the viewer preference file is compared to the plurality of the corresponding content codes. Finally, at least one of the plurality of audiovisual programs is selected in response to the comparison for presentation to the viewer.

20 Claims, 5 Drawing Sheets

| FIELD | DESCRIPTION | LENGTH |
|---|---|---|
| 1 | IDENTIFICATION | 7 |
| 2-20 | GENRE* | 30 |
| 21-25 | 5 TOP ACTORS/ACTRESSES (PLUS MINUTER ON SCREEN) | 8/ACTOR |
| 33-36 | 4 SCREEN/TV CRITIC RATINGS | 6/CRITIC |
| 37 | DATE RELEASED | 2 |
| 38 | SETTING | 3 |
| 39 | LENGTH | 3 |
| 40 | PERIOD (YEAR) | 2 |
| 41 | DIRECTOR | 4 |
| 42 | SCREEN WRITER | 4 |
| 43 | PRODUCER | 4 |
| 44 | STUDIO | 2 |
| 45 | NETWORK | 2 |
| 46 | MUSICAL SCORE | 2 |
| 47 | CINEMATIC ATTRIBUTES | 2 |
| 48 | SPECIAL EFFECTS | 2 |
| 49-50 | SPARE | 10 |
|  |  | 93 |

CONTENT HEADER LAYOUT

APPARATUS AND METHOD OF SELECTING VIDEO PROGRAMS BASED ON VIEWERS' PREFERENCES

TECHNICAL FIELD OF THE INVENTION

This invention is in the field of television media, and is more specifically directed to selecting television programs based on program content and viewer preference.

BACKGROUND OF THE INVENTION

The advent of fiber optics, increased data rates, efficient data formats, and related technologies have caused, and will continue to cause, the number of television channels available to subscribers to greatly increase. Consequently, the viewer is inundated with program choices from which to select a desirable program. Indeed, even the diligent viewer must expend a great deal of time sampling the numerous available programs, and such time expenditure is likely to be inefficient and potentially aggravating.

The prior art includes various systems directed toward enhancing television viewing efficiency. For example, U.S. Pat. No. 4,230,990, ("the '990 patent") was issued Oct. 28, 1980 to Lert, Jr. et al. and is entitled "Broadcast Program Identification Method And System." The '990 patent describes an automated system for identifying broadcast programs using pattern recognition. Specifically, a signature pattern is used with the program which is either inserted into the program, or derives from a naturally occurring portion of the program. The signature pattern is compared to numerous reference patterns in an attempt to identify the event of broadcasting a particular program. Such notification is stated to be helpful, for example, to advertisers wishing to verify broadcasting of commercials or, as another example, to artists collecting royalties based on program broadcasting.

As another example, U.S. Pat. No. 4,751,578 ("the '578 patent) was issued Jun. 14, 1988, to Reiter et al. and is entitled "System For Electronically Controllably Viewing On A Television Updateable Television Programming Information." The '578 patent describes an electronic system whereby a user telephones a central computer which downloads information to the user, such as television listing information. The user may then view the downloaded information on his/her television and access it using the television remote control unit. Access is permitted in various formats, some of which are determined by codes associated with programs. Thus, the system can search for the appropriately coded programs and display them to the user.

While the embodiments of the '990 and '578 patents may, in some instances, add convenience to television viewing, neither contemplates or addresses the problem of program selection in view of the viewer's personal preferences given tens, hundreds, and quite possibly thousands of programming choices. Therefore, it is an object of the present invention to provide a method and apparatus for automatically selecting a program or programs from a large number of selections, wherein the selection is based on the personal preferences of the viewer.

It is a further object of the present invention to provide such a method and apparatus such that an adaptive or neural system creates a preferred viewing file based on the personal preferences of the viewer.

It is a further object of the present invention to provide such a method and apparatus such that an adaptive or neural system updates a preferred viewing file based on the personal preferences of the viewer.

It is a further object of the present invention to provide such a method and apparatus wherein the neural system is a learning system such that it adapts its decision-making process based on ongoing feedback from the viewer.

It is a further object of the present invention to provide such a method and apparatus wherein content codes are embedded into programs before they are transmitted to viewers such that the codes describe various attributes about the corresponding program.

Other objects and advantages of the present invention will be apparent to those of ordinary skill in the art having reference to the following specification together with its drawings.

SUMMARY OF THE INVENTION

In one embodiment, the present invention includes a method for selecting audiovisual programs for presentation to a viewer. Each of the audiovisual programs has attributes and a corresponding content code including information pertaining to the attributes of the audiovisual program. The method includes various steps. First, a viewer preference file is stored which includes information pertaining to those attributes of audiovisual programs which affect the particular viewer and the degree of impact of those attributes on the viewer. Second, a plurality of content codes corresponding to a plurality of the audiovisual programs are received. Third, the viewer preference file is compared to the plurality of the corresponding content codes. Finally, at least one of the plurality of audiovisual programs is selected in response to the comparison for storage in the preferred viewing file and for eventual presentation to the viewer.

Various other embodiments, including methodologies arising from the above embodiments are also included within the present invention.

BRIEF DESCRIPTION OF THE DRAWINGS

For a more complete understanding of the present invention and its advantages, reference is now made to the following description taken in conjunction with the accompanying drawings, in which.

DETAILED DESCRIPTION OF THE INVENTION

Figure 1:
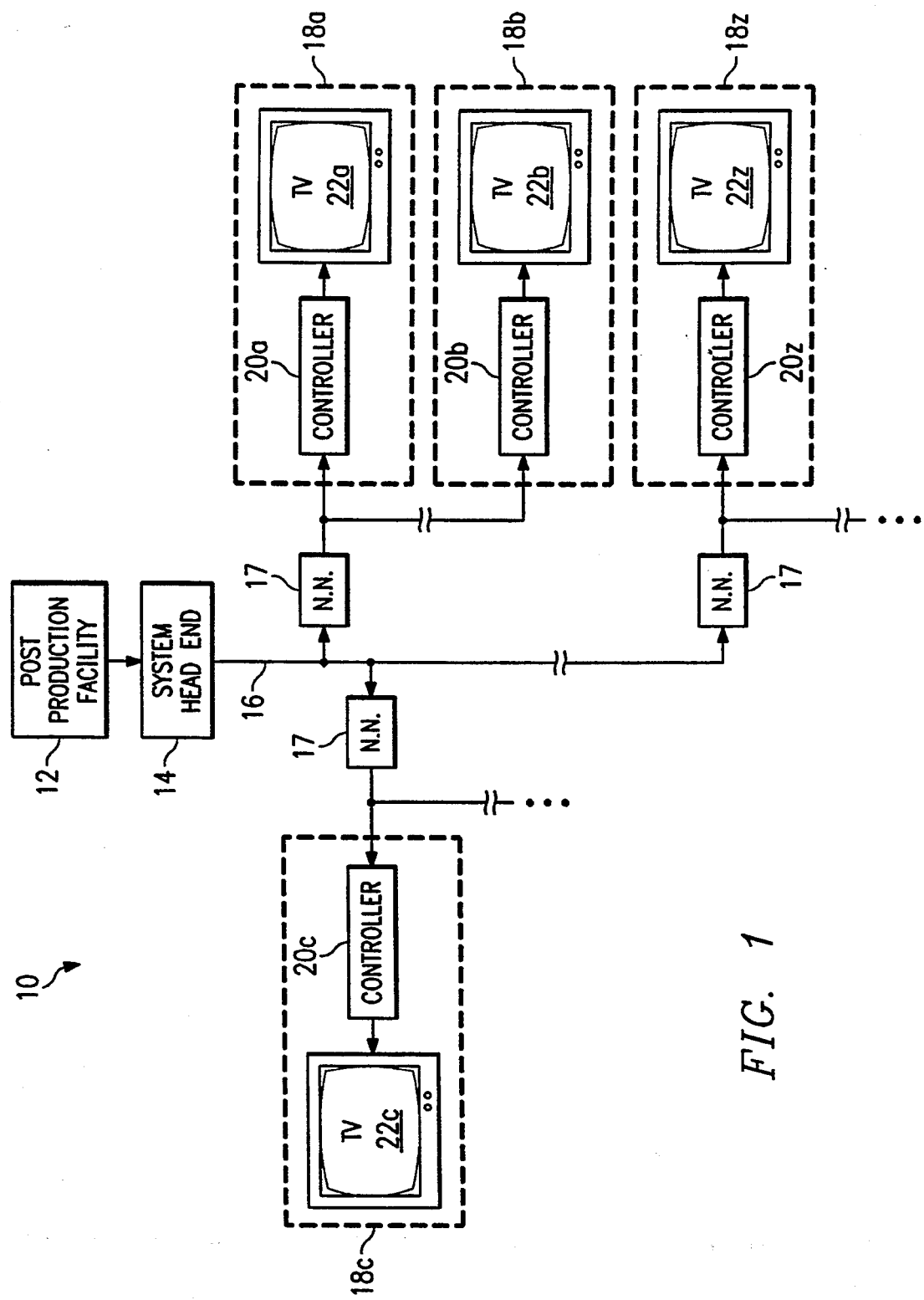
FIG. 1 illustrates a block diagram of a cable television system depicting the preferred environment for implementing the present invention.

The preferred embodiment of the present invention will now be described in detail relative to FIGS. 1 through 8. Referring first to FIG. 1, the present invention operates within the context of a cable system for communicating programs to viewers and designated generally at 10. Programs to be transmitted within cable system 10 typically originate from a movie or television post production facility 12. Facility 12 delivers the programs to a system head end 14. System head end 14 operates as an interface between facility 12 and the end viewers; thus, system head end 14 transmits the programs on one of many available channels to a communication medium, such as a cable 16.

Cable 16 connects the channels/programs to a number of home users, either directly, or as shown, through a neighborhood node 17. Typically, neighborhood node 17 serves anywhere from 500 to 2,000 home users. For purposes of ease of illustration, only a few home users are shown, and are designated as 18a, 18b, 18c and 18z, with the like number (i.e., "18") indicating the same general components, and the varying letter designation (i.e., "a" through "z") indicating that the number of home users may vary as known in the art. Each home user 18 includes the same two general components. For example, user 18a includes a converter/controller 20a and a television 22a. In general, converter/controller 20a selects a particular channel and conveys the program on the selected channel to television 22a. Further, however, converter/controller 20a also performs numerous other features. For example, converter/controller 20a typically provides de-compression of digital transmissions, preview information, television control, and navigation functions. In the embodiment of the present invention, however, and as discussed in detail below, converter/controller 20a also screens incoming programs and selects those which are likely to be of interest to a viewer based on the viewer's personal preferences. Television 22a, or a comparable device such as a monitor, displays the selected program to the individual user. The remaining home users include like components and, hence, are illustrated with corresponding reference numerals but different letter designations (e.g., user 18b includes converter/controller 20b and television/monitor 22b).

Figures 2, 3:
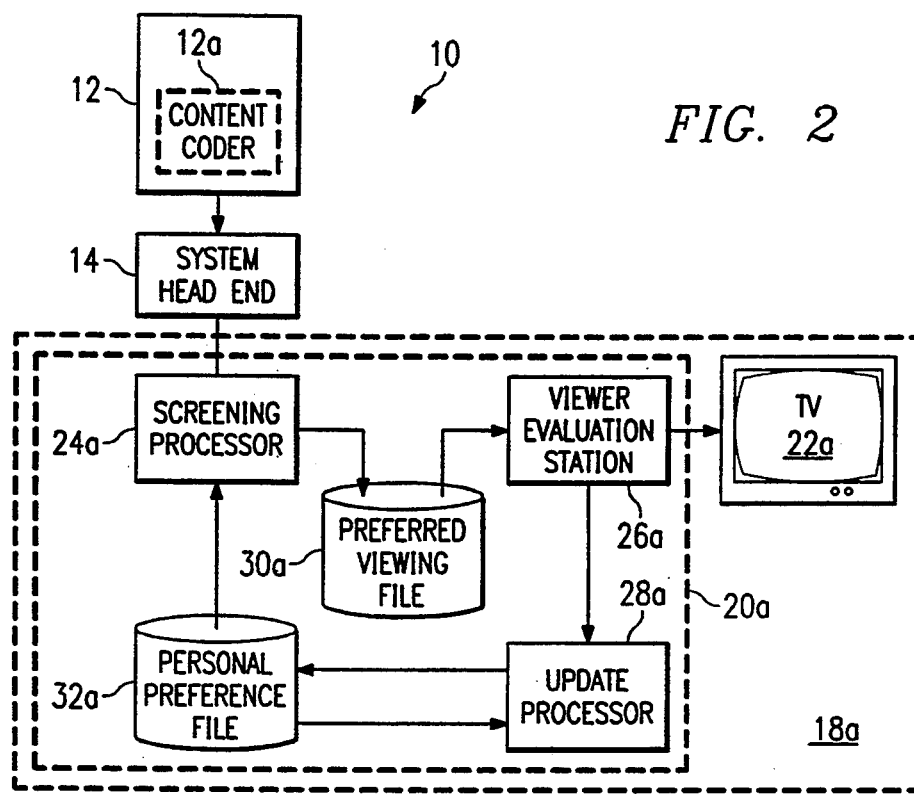
FIG. 2 illustrates a detailed block diagram of the components and files associated with the controller blocks shown in FIG. 1.
FIG. 3 illustrates the preferred fields of the content header used in the present invention to encode various attributes of an audiovisual program.

FIG. 2 illustrates an expanded block diagram of post production facility 12 and converter/controller 20a of FIG. 1 to illustrate the inventive operation with respect to a given home user 18a. Before proceeding, however, it should be understood that the same principles apply to other home users (e.g., 18b, 18c, 18z) as well. It also should be understood that some of the functions described in connection with the converter/controller 20aof FIG. 2 might be housed in other locations, such as a neighborhood node 17 or system head end 14. The specific location of a function is preferably chosen by considerations of efficiency. Thus, if a particular function requires large amounts of digital storage, and such storage is available at a neighborhood node 17, then the storage function is preferably performed at that location. Naturally, other functions, such as digital processing, also may be relocated to locations where such functionality is available and/or most efficiently performed. Note also that neighborhood node 17 is not shown in FIG. 2 for purposes of simplifying the drawing.

With reference to FIG. 2, post production facility 12 includes a content coder 12a. Content coder 12a is preferably a microprocessor-based device which, as described in greater detail with respect to FIG. 3, encodes descriptive information about the attributes of each video program. The descriptive information may include, for example, the name of the program, the stars, the author, the director, a story synopsis and additional information described below. In addition, content coder 12a ,inserts the encoded description into the digital information representing the actual video signal for the particular program. Thus, the information may be added to a video tape, disk or other medium storing the digital program information. Consequently, the encoded description is passed along with the program itself through system head 14 to cable 16.

The program and encoded description pass via cable 16 to home user 18a and, more particularly, to converter/controller 20a . Converter/controller 20aincludes a screening processor 24a, a viewer evaluation station 26a, and an update processor 28a. The detailed functionality of these blocks is discussed below, but a brief overview before proceeding is instructive. Screening processor 24a is preferably a single or multiple microprocessor system which receives a program(s) from cable 16, calculates a program grade, and generates a preferred viewing file 30a. Preferred viewing file 30a lists the program grades, and preferably the story synopsis, for the programs determined to be of highest interest to the viewer. Preferred viewing file 30a is available to viewer evaluation station 26a. Viewer evaluation station 26a preferably includes a set-top cable converter box and an input device such as a remote control or a keyboard. Station 26a is coupled to television 22a for displaying selections stored in preferred viewing file 30a. Station 26a also allows the viewer to input its program preferences as well as to evaluate the results created by controller 20a. Viewer evaluation station 26a is coupled to update processor 28awhich has access to, and modifies, a personal preference file 32a. Personal preference file 32a is established and modified to reflect the personal preferences of a viewer with respect to various program attributes. Consequently, preference file 32a is also available to screening processor 24a for performing the functions described above, and detailed below.

FIG. 3 illustrates one embodiment for encoding the descriptive program information by content coder 12a in the form of a content header. The content header is arranged in a series of 50 fields. In the preferred embodiment, the complete content header is less than 1K bits in length and, thus, is approximately two parts in one million of the required memory to store a digitally compressed one hour program. The fields and a more detailed description of each is as follows:

Field: Description 1 (identification): uniquely identifies a particular program using seven digits.

2–20 (genre): represents a particular genre class (e.g., action, comedy, drama, news, historical, mystery, western, violence, musical, shopping, romance, dance, erotic, horror, science fiction, game, etc.) using thirty digits. Each genre field contains a rating of zero to eight for that particular genre class. For example, a particular program may receive a seven for action, three for comedy, zero for musical, one for romance, zero for dance, one for erotic, eight for violence, one for horror, and zero for science fiction.

21-25 (actors/actresses): identifies each of the top five actors/actress using a unique five digit identification number plus three digits corresponding to the number of minutes that particular actor/actress is on screen.

33-36 (critic): identifies various critics by a unique four-digit identification code and their applicable rating of the particular program (using two digits, 1 to 99).

37 (date released): identifies the initial date of publication of the program.

38 (setting): identifies the setting in which the story/program takes place.

39 (length): identifies the duration of the program in whatever desirable units (e.g., minutes).

40 (period/year): identifies the period in which the story/program takes place.

41 (director): uniquely identifies the director(s) of the program.

42 (screen writer): uniquely identifies the screen writer(s) of the program.

43 (producer): uniquely identifies the producer(s) of the program.

44 (studio): uniquely identifies the production studio of the program.

45 (network): uniquely identifies the broadcasting network of the program.

46 (musical score): identifies the characteristic of the musical score.

47 (cinematic attributes): identifies the cinematic characteristics of the movie.

48 (special effects): describes any unusual special effects.

49-50 (spare): these fields are intentionally open-ended for future flexibility of additional and/or alternative fields. Of course, while fields 1-50 represent the preferred content header, it should be understood that one skilled in the art could choose more, less, and/or alternative fields without departing from the spirit of the intended invention.

Having explained the preferred format of the content header, reference is now returned to FIG. 2 for the detailed operation of its functional blocks. Personal preference file 32a is initially loaded into controller 20a to provide a foundation for analyzing and selecting subsequently arriving programs according to the viewer's preferred interests. In the preferred embodiment, personal preference file 32a includes codes relating to the impact of various attributes of the audiovisual programs on the viewer, that is, reflecting the tastes, interests, and preferences of the viewer with respect to those attributes. These codes correspond to the fields within the content headers of the coded programs and, thus, correspond to the attributes of a program defined by those fields. Note also that file 32a includes a preference ranking of all actors and actresses that a viewer has ever ranked. Newscasters, subjects of the news, talk show hosts, talks show gusts, sports announcers and the like are also included in this group. The codes for preference file 32a may be solicited by various techniques, including a mailed questionnaire, telephone interview, or by a television menu controlled by key/remote control input. Note also that file 32a is preferably arranged in a format such that it may be transported either by telecommunication link routing or "smart card" to any distant location of the viewer who created the file. Moreover, to preserve confidentiality, file 32a also is formatted or protected in a manner so that only the viewer creating it has access to its contents.

Once personal preference file 32a is established, screening processor 24a evaluates programs (more particularly, the program content headers) in view of the viewer preferences established in file 32a. Particularly, screening processor 24a compares a program content header to personal preference file 32a and generates a grade for each analyzed program using a hierarchical analytic decision-making process described below. Programs receiving a favorable grade are stored in preferred viewing file 30a. In the preferred embodiment, file 30a consists of the ten programs receiving the highest grade from screening processor 24a.

Figure 4:
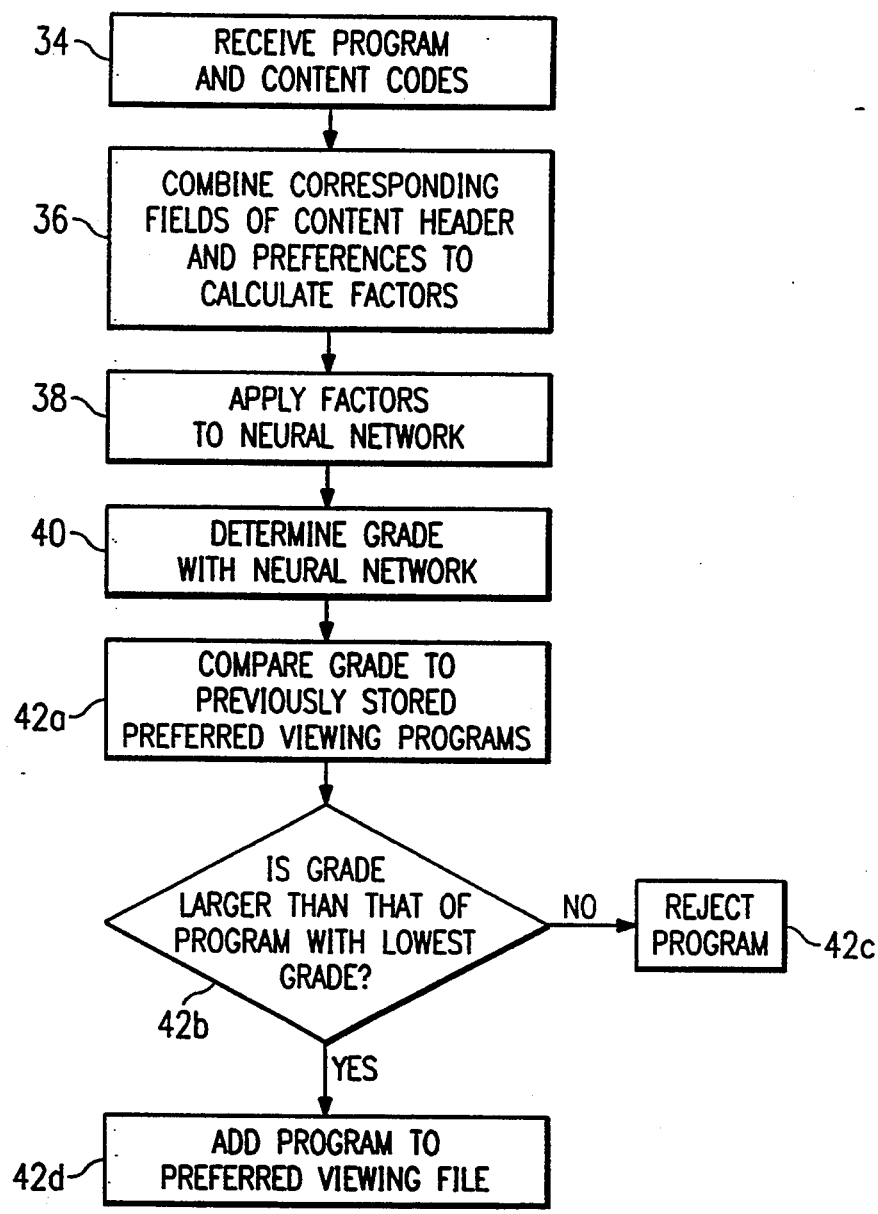
FIG. 4 illustrates a flow chart of the general methodology of evaluating a candidate program using the present invention.

FIG. 4 illustrates the preferred detailed steps for performing the screening processor methodology. In block 34, a new content coded program is received from cable 16 and the content header is input to screening processor 24a. In block 36, each header field value is combined with the corresponding category from personal preference file 32a to obtain a corresponding factor. In block 38, each of these factors is coupled to the appropriate input of a neural network process performed by screening processor 24a. As detailed below, the neural network process predicts the programs in which a viewer would have the highest interest by determining a grade for each analyzed program. Thus, in block 40, the neural network outputs a program grade corresponding to the program being analyzed. Finally, in block 42a, the program grade is compared to the ten grades corresponding to the ten programs previously stored in preferred viewing file 30a. Block 42b determines if the newly-calculated grade is larger than that of the lowest of the ten stored preferred grades. If the grade is not larger, then in block 42c the program is deemed of insignificant interest to the viewer and rejected. If, however, the newly-calculated grade is larger than the lowest preferred grade, then in block 42d a program identifier for the program corresponding to the grade is stored in preferred viewing file 30a, thereby updating the file with the new program. Moreover, the previously-stored program with the lowest grade is dropped from file 30a, thereby leaving the top ten grade programs stored therein. Note that if two programs have the same lowest grade within the ten programs stored in file 30a, the most recent is retained while the older is discarded from the file. Lastly, note that the viewer may display the contents of file 30a at his or her leisure, thereby notifying the viewer of the selected programs for their viewing pleasure.

As mentioned above in connection with FIG. 2, controller 20a also includes a viewer evaluation station 26a which interacts with the viewer to solicit his/her preferences regarding programs and program attributes. In the preferred embodiment, viewer input of preferences to station 26a occurs in any of three different modes described immediately below.

Figure 5:
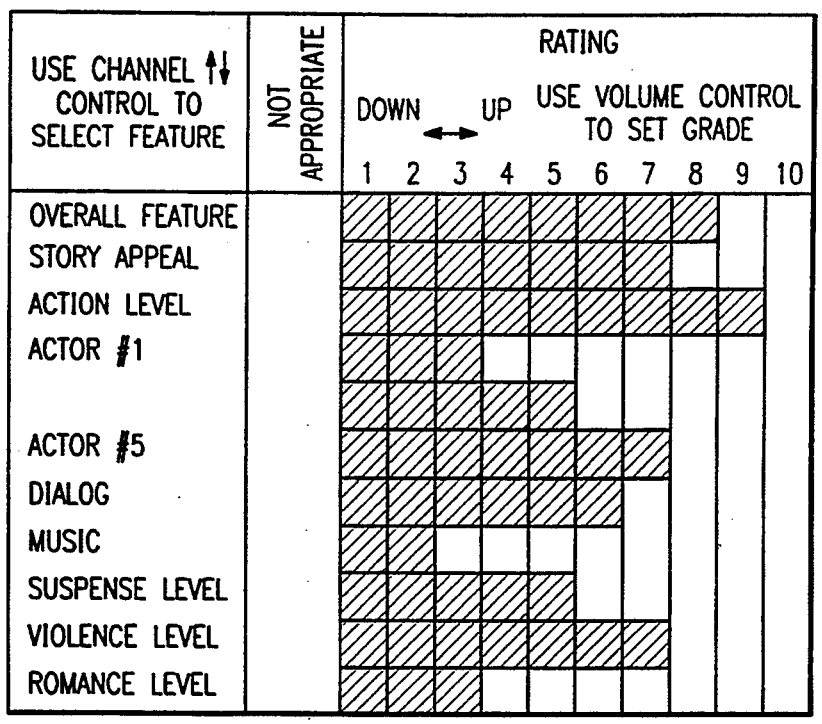
FIG. 5 illustrates an example of a screen display used to solicit ratings from a viewer pertaining to various attributes of an audiovisual program.

The first viewer input mode for gathering viewer preference data occurs after a particular program has been viewed. At this time, a series of questions are presented to the viewer on television 22a. The viewer answers the questions with an input device such as a keypad or remote control. A screen illustrating a typical set of questions is shown in FIG. 5. Thus, for each feature shown in the left column of FIG. 5, the viewer adjust the corresponding horizontal bar graph to the rating appropriate for the program just watched. For example, in FIG. 5, the user has adjusted the overall grade to a rating of eight, the story appeal to a rating of seven, the action level to a rating of nine, and so forth.

Figure 6:
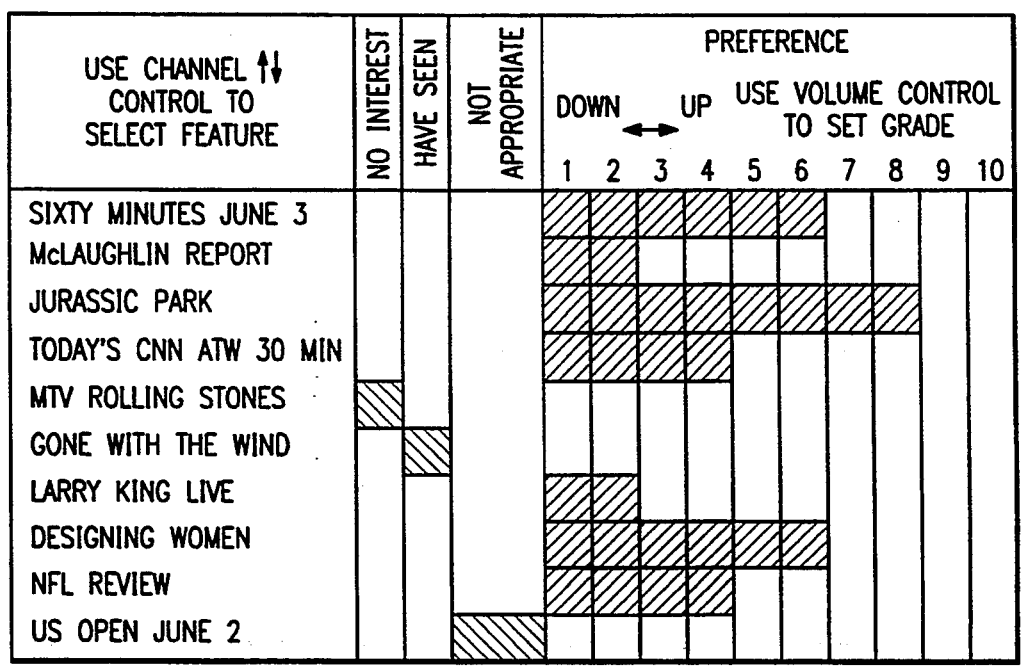
FIG. 6 illustrates an example of a screen display used to solicit rankings from a viewer pertaining to various programs previously chosen by the system as the viewer's preferred listing of audiovisual programs.

The second viewer input mode for gathering viewer preference data occurs when the viewer tunes to a preview channel to view the program listing of preferred viewing file 30a. FIG. 6 illustrates a typical screen shown on the preview channel. In this mode, the programs titles stored in preferred viewing file 30a are displayed to the viewer. Note that the number of programs in this file is between 0 and 10. The viewer ranks the displayed programs on a preference scale which ranges from one to the number of programs in file 30a. Thus, if there are only five programs in the file (and, thus, five displayed programs), the viewer ranks the displayed programs from one to five. Note that other parameters about the displayed programs also may be solicited, such as whether the viewer has seen the program before.

The third viewer input mode for gathering viewer preference data occurs when the viewer participates in a trivia game show. Specifically, the present invention contemplates the transmission of a game show to viewers wherein the game show solicits viewers to rate program attributes such as movies, actors, directors, etc. For example, the game show might display a synopsis of a program, and ask the viewer to grade various aspects of the program in their own preferences as well as their predictions of the preferences of the majority of other viewers participating in the game show. Various prizes and the like may be used to encourage viewers to participate in the game show. Regardless of the format of the game show, inquiries are issued to the viewer so that updated information is obtained pertaining to the viewer's program preferences.

Having described the alternative processes for acquiring the viewer personal preferences, note that such preferences are used for two purposes. First, the new preferences supersede those in personal preference file 32a which were earlier input by the viewer and, thus, update processor 28a modifies, or "updates," file 32a to reflect any changes in viewer preference. Second, the new preferences are used to enhance the accuracy of the grade formulated by controller 20a. Specifically, the present invention preferably includes a neural weighing system to determine a grade for each incoming program. Such a system includes weighing factors to formulate its grade. Thus, update processor 28a modifies these weighing factors in view of the newly entered preferences to enhance the accuracy of future grades attributed to incoming programs. In other words, the weights are adjusted so that the calculated grade approaches the actual grade given by the viewer.

From the above, it should be appreciated that the present invention provides apparatus and methodology for screening incoming programs and selecting those with the highest interest to a viewer based on the viewer's personal preferences regarding numerous program attributes. As mentioned above, the method selects programs by giving each a grade, and storing those programs with the highest relative grades. Grade formation is preferably performed using computing techniques commonly referred to as adaptive, or neural, networks. Neural network computing techniques are well known and have been used for the solution of certain types of problems. These neural networks are commonly implemented by computer programs operating on conventional computing equipment; it should be noted, however, that special dedicated hardware for the implementation of neural networks also has been constructed and implemented as known in the art.

Figure 7:
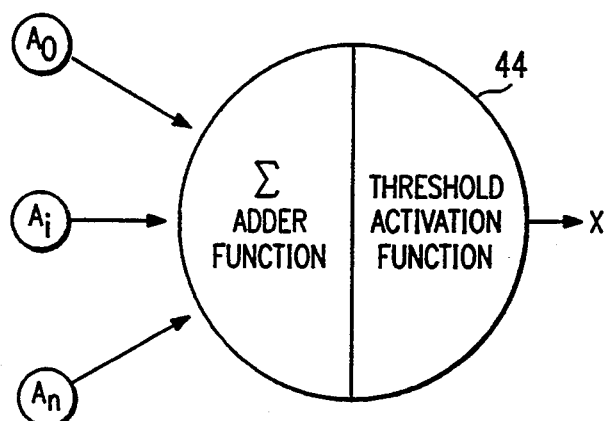
FIG. 7 illustrates a generalized diagram of a neural network neuron element.
Figure 8:
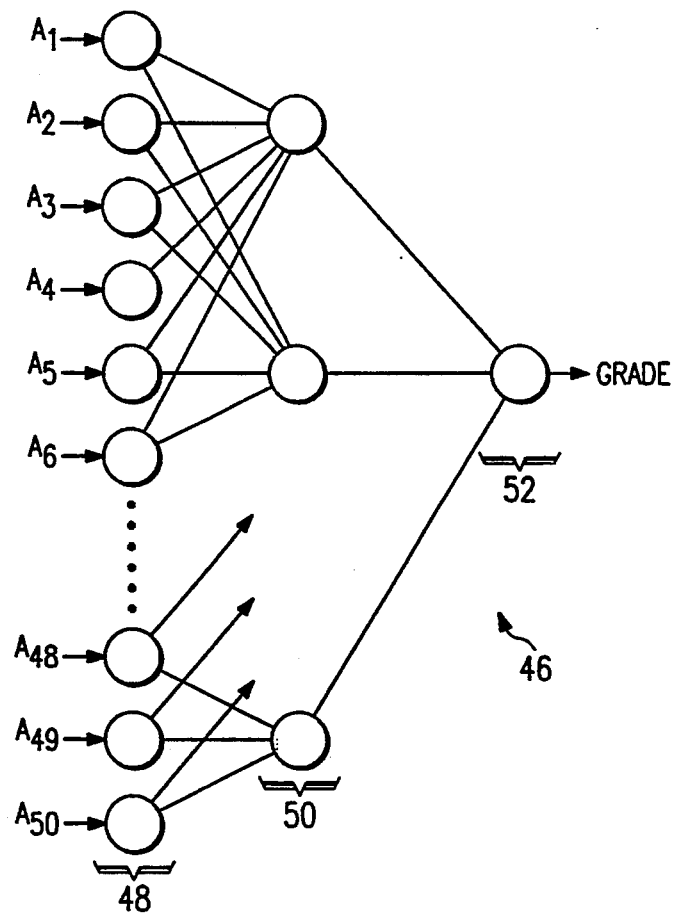
FIG. 8 illustrates a neural network for receiving inputs related to content coding and viewer preference information and for outputting a grade for the audiovisual program associated with the given inputs.

Neural networks are typically illustrated comprising numerous simple processing units called neurons. FIG. 7 illustrates a model of a neuron indicated generally at 44. Neuron 44 includes multiple inputs, called synapses, designated $A_0$ through $A_n$. Neuron 44 also includes one output, designated x, which, as illustrated in FIG. 8, may be connected to the inputs of several different neurons. The output value, or activation, of neuron 44 is related to its state, which is computed by applying a threshold function to inputs $A_0$ through $A_n$. The threshold function is generally non-linear and is dependent on the sum of the products of each incoming neuron's output and the synaptic weight of the connection to the respective output. A typical threshold function is based on added functions of the following form:

$$x = \sum_{i=1}^{n} A_i w_i \qquad \text{Eqn. 1}$$

where, n is the number of incoming neurons;

A is the vector of incoming neurons; and w is the vector of synaptic weights. Since the relationships in a viewer selection system are likely non-linear, it is preferable that the activation functions of the neurons also be non-linear.

FIG. 8 illustrates a conventional neural network designated generally at 46 and in accordance with the present invention. Network 46 is a representation of the operation of a computer program; such a representation for computer programs of this type is conventional and well-known in the art. Network 46 includes three groups of neurons 48, 50 and 52, arranged in layers. Each neuron of layer 48 receives an input ($A_i$) to network 46, and the layer is referred to as the input layer. Conversely, the single neuron layer 52, which presents an output from network 46, is referred to as the output layer. Note that the output layer could include additional neurons as well. In the present embodiment, the output represents the grade for the program being analyzed. The layer of neurons 50, each of which receives inputs from input neurons 48, and presents an output to output neuron 52, is commonly referred to as a hidden layer. Each neuron of each layer receives an input and calculates a weighted sum as discussed in connection with FIG. 7 and Eqn. 1, above.

In the present invention, the inputs $A_1$ through $A_{50}$ correspond to a combination of the fifty fields characterized in the program content header and each corresponding field in personal preference file 32a. The particular method of combining a specific field and preference depends on the given attribute. For example, with respect to the actor fields 21 through 25, the top five actors/actresses in a program are matched with their ratings contained in personal preference file 32a. The actor/actress rating in personal preference file 32a for each of the top five actors/actresses is then multiplied times the number of minutes the corresponding actor/actress appears in the program. This product is entered as an input to one of inputs $A_{21}$ through $A_{25}$. As another example, for the genre inputs $A_2$ through $A_{20}$, the value in the content header is multiplied times the rating attributed to the corresponding genre in preference file 32a and the product is received by the genre inputs. In the preferred embodiment, the remaining fields are handled in a like manner.

Neural networks "learn from experience," that is, they adjust their weights (or synapses) based on a known set of inputs and the expected correct output. In order for a neural network to solve a problem, the weighing factors for the nodes first must be set to proper values according to the problem to be solved. This training procedure is performed by comparing the estimated grade of a given program with the actual grade which a viewer would assign that same program. For example, under the present invention, the weights are adjusted after a viewer gives an overall rating to a program just watched. In other words, the network may then be trained by comparing the grade it automatically formulated with the grade the viewer actually assigned after viewing the program. Thus, the weights of the system may be adjusted until the grade output by the neural network 46 matches, or at least closely approximates, the grade assigned by the viewer after watching the program. In the preferred embodiment, this adjustment procedure is accomplished by a procedure known in the art as backpropagation. Under this methodology, the inputs are presented with known desired values. The output of the neural network is compared against the desired result, and an operation which backpropagates error information from the output nodes of a layer toward the input nodes is used to correct the weighing factors according to the error information. Backpropagation is an iterative process, both iterative toward converging the error to within a certain tolerable limit for a given input example, and iterative for multiple examples.

From the above, it should be appreciated that the present invention includes a preferred method and apparatus whereby a viewer faced with numerous program choices may select from a subset of those programs. The subset is identified in a preferred viewing file automatically created by comparing the viewer's own preferences for various program attributes with a coded field having ratings for corresponding attributes. Note, however, while the invention has been described herein relative to its preferred embodiments, it is of course contemplated that modifications of, and alternatives to, these embodiments, will be apparent to those of ordinary skill in the art having reference to this specification and its drawings. For example, while video "programs" have been described herein, note that such programs may include any type of audio or visual broadcast (referred to collectively as audiovisual programs). Such broadcasts could include pay-for-view, video-on-demand programming, and other available multimedia information. As another example, while FIG. 2 illustrates functional blocks for performing the methodology of the invention, such an illustration is not intended as a limiting architecture and, thus, other configurations using single or multiple, serial or parallel processing capabilities, are believed to be within the knowledge of a person skilled in the art. As still another example, while the encoded information has been described herein as a content header immediately preceding a program, other techniques for transmitting the descriptive program information may be used. For example, such information could be transmitted at predetermined time intervals well ahead of the corresponding program. As still a final example, alternative adaptive decision-making systems could be implemented to better compare/contrast the viewer's preferences with those encoded in the content header. Accordingly, these examples, as well as other examples or modifications appreciated by one in the art, are also intended within the scope of this invention as defined by the following claims.

What is claimed is:

1. A method for selecting audiovisual programs for presentation to a viewer, each of the audiovisual programs having a plurality of program attributes and a corresponding content code comprising a plurality of information fields representing the plurality of program attributes of the audiovisual program, comprising the steps of:

storing a viewer preference file, wherein said viewer preference file comprises a plurality of attribute ratings corresponding to the plurality of program attributes, wherein each of said attribute ratings represents the viewer's preference of the program attribute corresponding to said rating;

for a plurality of the audiovisual programs, receiving a plurality of the corresponding content codes;

for each of said received content codes, comparing said viewer preference file to said corresponding content code such that each of said viewer's attribute ratings is compared with the corresponding information field in said corresponding content code; and in response to said comparing step, selecting at least one of the plurality of audiovisual programs for presentation to the viewer.

2. The method of claim 1 and further comprising the step of updating said viewer preference file.

3. The method of claim 2 and further comprising the steps of:

displaying a predetermined audiovisual program to a viewer; and receiving ratings from the viewer corresponding to the attributes for said predetermined audiovisual program, before said updating step.

4. The method of claim 2 and further comprising the steps of:

storing a plurality of preferred audiovisual programs in a list in response to performing a plurality of said selecting steps;

displaying said preferred list of audiovisual programs to a viewer; and soliciting a ranking from the viewer for each of said preferred list of audiovisual programs, before said updating step.

5. The method of claim 1 wherein the corresponding content codes and said viewer preference files each comprise corresponding fields of the attributes, and wherein step of comparing comprises the steps of:

multiplying fields of a predetermined content code with corresponding fields of said viewer preference file to obtain a plurality of products;

applying said plurality of products to a neural network; and determining a grade corresponding to said predetermined content code based on said products.

6. The method of claim 5 and further comprising the steps of:

performing said multiplying, applying, and determining steps for a plurality of content codes to obtain a plurality of corresponding grades;

choosing a subset of said plurality of corresponding grades based on the relative magnitudes of said grades; and storing a preferred list of audiovisual programs corresponding to said grades in response to said choosing step.

7. The method of claim 6 and further comprising the steps of:

displaying said preferred list of audiovisual programs to a viewer; and soliciting a ranking from the viewer for each of said preferred list of audiovisual programs.

8. The method of claim 7 and further comprising the step of updating said viewer preference file in response to said soliciting step.

9. The method of claim 5 wherein said neural network comprises weighing factors, and further comprising the steps of:

receiving updated viewer preference information; and adjusting said weighing factors in response to said updated viewer preference information.

10. A method for selecting audiovisual programs for presentation to a viewer, each of the audiovisual programs having a plurality of program attributes and a corresponding content code comprising respective fields of information pertaining to the plurality of program attributes of the audiovisual program, comprising the steps of:

storing a viewer preference file, wherein said viewer preference file comprises a plurality of attribute ratings corresponding to the plurality of program attributes, wherein each of said attribute ratings represents the viewer's preference of the program attribute corresponding to said rating;

for a plurality of the audiovisual programs, receiving a plurality of the corresponding content codes;

multiplying fields of a predetermined content code with corresponding fields of said viewer preference file to obtain a plurality of products for a predetermined audiovisual program;

applying said plurality of products to a neural network;

determining a grade corresponding to said predetermined content code based on said products;

repeating said receiving, multiplying, applying, and determining steps for a plurality of content codes to obtain a plurality of corresponding grades for a plurality of corresponding programs;

choosing a subset of said plurality of corresponding grades based on the relative magnitudes of said grades; and storing a preferred list of audiovisual programs corresponding to said grades in response to said choosing step.

11. The method of claim 10 and further comprising the steps of:

displaying a predetermined audiovisual program to a viewer;

receiving ratings from the viewer corresponding to the attributes for said predetermined audiovisual program; and updating said viewer preference file.

12. The method of claim 10 and further comprising the steps of:

displaying said preferred list of audiovisual programs to a viewer;

soliciting a ranking from the viewer for each of said preferred list of audiovisual programs; and updating said viewer preference file in response to said soliciting step.

13. Apparatus for selecting audiovisual programs having a plurality of program attributes, comprising:

means for storing a viewer preference file, wherein said viewer preference file comprises a plurality of attribute ratings corresponding to the plurality of programming attributes, wherein each of said attribute ratings represents the viewer's preference of the program attribute corresponding to said rating;

means for receiving a plurality of the audiovisual programs having a plurality of corresponding content codes, wherein each of said content codes comprises a plurality of information fields representing the plurality of program attributes; and means for comparing said viewer preference file to said plurality of the corresponding content codes, such that each of said viewer's attribute ratings is compared with the corresponding information field in said corresponding content code.

14. The apparatus of claim 13 and further comprising means for selecting at least one of the plurality of audiovisual programs in response to said comparing means.

15. The apparatus of claim 13 and further comprising means for updating said viewer preference file.

16. The apparatus of claim 13 wherein said means for comparing comprises neural network means.

17. The apparatus of claim 13 and further comprising:

means for displaying a predetermined audiovisual program to a viewer; and means for receiving ratings from the viewer corresponding to the attributes for said predetermined audiovisual program.

18. The apparatus of claim 13 and further comprising means for selecting a subset of the plurality of audiovisual programs in a preferred viewing list in response to said comparing means.

19. The apparatus of claim 18 and further comprising:

means for displaying said preferred list of audiovisual programs to a viewer; and means for soliciting and receiving a ranking from the viewer for each of said preferred list of audiovisual programs.

20. The apparatus of claim 13 and further comprising means for transmitting said corresponding content codes.

* * * * *

UNITED STATES PATENT AND TRADEMARK OFFICE
CERTIFICATE OF CORRECTION

PATENT NO. : 5,410,344

DATED : April 25, 1995

INVENTOR(S) : Gordon T. Graves, Brendan M. O'Connor, Alva C. Barker

It is certified that error appears in the above-indentified patent and that said Letters Patent is hereby corrected as shown below:

Col. 3, ln. 62, insert a space between "20a" and "of".

Col. 4, ln. 15, delete "12a ,inserts", insert --12a, inserts--.

Col 4, ln. 24, insert a space between "20a" and "includes".

Col. 4, ln. 44, insert a space between "28a" and "which".

Col. 8, ln. 28, begin a new paragraph with the word "Since...".

Col. 10, ln. 50, delete "list of audiovisual programs" and insert --audiovisual programs in said list--.

Col. 11, ln. 12, delete "preferred list of audiovisual programs" and insert --audiovisual programs in said preferred list--.

UNITED STATES PATENT AND TRADEMARK OFFICE
CERTIFICATE OF CORRECTION

PATENT NO. : 5,410,344
DATED : April 25, 1995
INVENTOR(S) : Gordon T. Graves, Brendan M. O'Connor, Alva C. Barker It is certified that error appears in the above-indentified patent and that said Letters Patent is hereby corrected as shown below:

Col. 12, ln. 12, delete "preferred list of audiovisual programs" and insert --audiovisual programs in said preferred list--.

Col. 12, ln. 54-55, delete "preferred list of audiovisual programs" and insert --audiovisual programs in said preferred list--.

Signed and Sealed this

Thirty-first Day of October 1995

Attest:

BRUCE LEHMAN

Attesting Officer     Commissioner of Patents and Trademarks